June 20, 1944.  H. NERWIN  2,351,999

ROLLFILM CAMERA

Filed Dec. 28, 1940

Inventor:
Hubert Nerwin
By:-
Singer, Ehlert, Stern & Carlberg
Attys.

Patented June 20, 1944

2,351,999

UNITED STATES PATENT OFFICE 2,351,999

ROLL-FILM CAMERA

Hubert Nerwin, Dresden, Germany; vested in the Alien Property Custodian

Application December 28, 1940, Serial No. 372,031
In Germany September 8, 1939

2 Claims. (Cl. 95—31)

The invention relates to improvements in roll-film cameras and particularly is directed to roll-film cameras employing as negative material a film strip provided with perforations in its longitudinal edges.

In rollfilm cameras of this type it is customary to employ a sprocket which engages the perforations in the film so as to transmit or receive a movement impulse. In order to prevent excessive wear and a tearing of the web portions between the perforations of the film it is not advisable that only one tooth of the sprocket at the time engages the film perforations. Until now it was very difficult, however, to install a sprocket of sufficient diameter that would engage the film with more than one tooth, because there is usually not sufficient space in the camera casing for such a large-sized sprocket and it would also be difficult to obtain the necessary transmission ratio, since it is not possible to increase the size of the camera to the required thickness the more so as it is of great importance to keep the size of the camera casing as small as possible.

It is the principal object of the present invention to provide a camera of the above mentioned type with a camera casing of decreased size and also with means which engage the film simultaneously with more than one tooth for receiving or transmitting to the perforated film movement impulses. The novelty consists in the employment of toothed elements of relatively small height measured in the direction of the thickness of the camera, said elements being moved in synchronism and their teeth mesh with the perforations of the film.

It is also an object of the invention to mount the toothed elements which engage the perforations of the film within the area occupied by the partition wall which is positioned in the picture plane and is provided with the customary picture window across which the film is moved. Preferably, the toothed elements are arranged along the longitudinal sides of the picture window, thus permitting a substantial decrease in the length of the camera casing.

Another object of the invention is to provide the camera with at least two sprockets of relatively small diameter which are rotated in synchronism, but whose teeth are so arranged with respect to each other that alternately one tooth of one sprocket, etc., and then a tooth of the other sprocket enters into the film perforations.

It is also an object of the invention to provide the camera with endless conveyor bands or chains provided with tooth-like projections which engage the perforations of the film at that portion which moves across the picture window in the focal plane.

All these means for engaging the film perforations may be used for operating a film advance locking device, an exposure counting mechanism and the like. The parts of the present invention, including the devices connected therewith, as an interlock between the film advancing mechanism and the shutter release, may be conveniently mounted in the space available in the casing of the present day miniature cameras which employ standard motion picture film as negative material.

With these and other objects in view as will be apparent or will be specifically pointed out in the description forming a part of this specification, the invention will now be described with reference to the accompanying drawing, which illustrates by way of example two embodiments of the invention.

Figure 1:
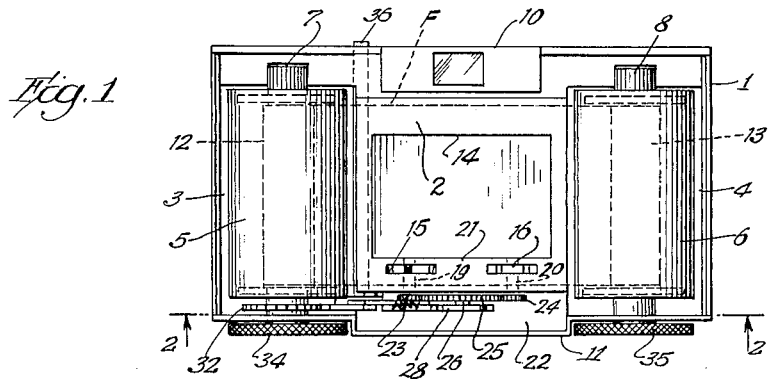
Fig. 1 is a rear elevation view of a camera with the detachable rear cover removed and with the wall removed which normally covers the gear mechanism.
Figure 2:
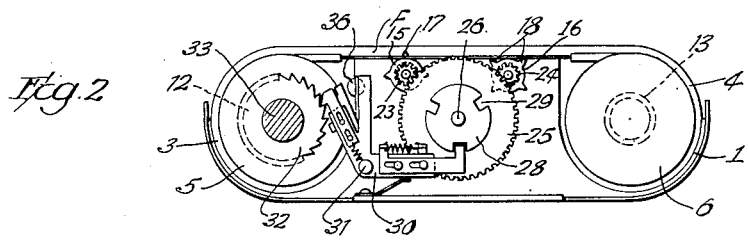
Fig. 2 is a bottom view of the camera shown in Fig. 1, viewed in the direction of the arrows.

Referring to the Figs. 1 and 2, the camera casing 1 is provided at its two ends with cylindrically shaped cavities 3 and 4 respectively, for the roll-film magazines 5 and 6 respectively, or in the case of daylight loading for the film take-up and film supply spools respectively. The camera is intended to be loaded with standard motion picture film whose marginal portions have perforations as is well known in the art. The film spools 12 and 13 are inserted into the magazines 3 and 4 or directly into the cavities 3 and 4 in such manner that the conventional knurled ends 7 and 8 of the spools are directed upwardly, i. e. they face the top wall 10 of the camera casing, and not the bottom wall 11 as heretofore practiced.

The rollfilm F, when moved from one spool to the other across the wall 2 containing the picture window 14 in the focal plane of the camera, engages with the perforations in its lower edge two relatively small sprockets 15 and 16 which are mounted substantially symmetrically with respect to a vertical plane passing through the optical axis of the camera. The teeth 17 and 18 of the sprockets 15 and 16 respectively, are arranged in such manner to each other that alternately one tooth of one of the two sprockets and then a tooth of the other sprocket engages a perforation of the film.

The sprockets 15 and 16 are attached to one end of a shaft 19 and 20 respectively, journaled in the partition 21 which forms a wall of a separate chamber 22 which contains the gear mechanism and other mechanical devices of the camera. The other ends of the shafts 19 and 20 have attached thereto a pinion 23 and 24 respectively which are in mesh with a large gear 25. The shaft 26 on which the gear 25 is mounted has also attached thereto a locking disc 28 provided with notches 29. A double-armed lever 30, which is pivotally attached to the camera casing at 31 forms an alternately actuated interlocking connection between the locking disc 28 and the shutter release member 36 on one hand and the disc 28 and a ratchet wheel 32 at the other hand. The ratchet wheel 32 is mounted on the shaft 33 of the manually operable film winding knob 34 arranged at the outer face of the bottom wall 11 of the camera casing 1. The other film spool 13 is rotatable by a film winding knob 35.

When the film F is wound upon the spool 12 in the magazine 5, the film F owing to its engagement with the teeth of the sprockets 15 and 16 rotates the latter in a manner that alternately the sprocket 15 and then the sprocket 16 is driven; the sprocket which happens to be out of engagement with the film is merely taken along i. e. without receiving a direct drive impulse from the film F. The sprockets 15 and 16 in turn rotate the gears 23, 24, 25, the latter of which rotates the locking disc 28, which after each actuation of the shutter release member 36 is rotated during the film advance one step, i. e. until the next notch 29 reaches and is engaged by the lever 30. The lever 30, in a manner which forms no object of the present invention, is lifted out of engagement with the locking disc 28 during the shutter release movement and again engages the disc 28 when the film has been advanced about the distance of one picture frame.

The described arrangement of the sprockets 15, 16 may not only be used for rotating the locking disc 28, but may also be used for operating other mechanical devices, for instance, a counting mechanism, means for tensioning the shutter, and the like. If desired, the sprockets 15, 16 may be connected by means of suitable intermediate gears with the film winding knob 34 and so be driven by the latter. Furthermore, instead of bringing the sprockets 15, 16 in engagement with only one row of perforations of the film, one of the two sprockets may be arranged so that it engages the other row of perforations. In the latter instance, both sprockets may be mounted on one and the same shaft or may be connected with each other by a suitable drive connection. It is also feasible to employ two pairs of sprockets, one for each row of perforations of the film, whereby each pair serves a different function, for instance, one pair for actuating the film advancing locking device 29, 30 and the other pair for tensioning the shutter.

Figure 3:
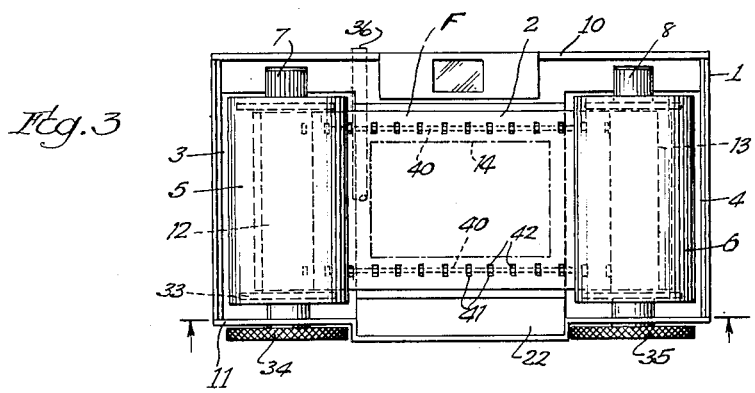
Fig. 3 is a rear elevation view similar to Fig. 1, of a modfication.
Figure 4:
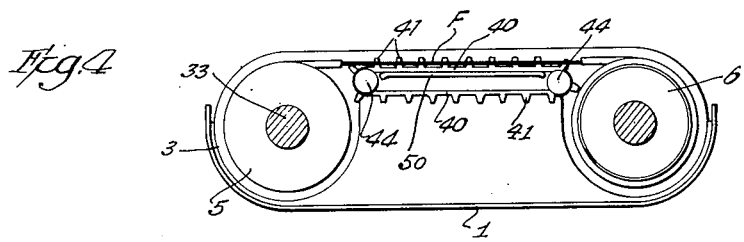
Fig. 4 is a bottom view of the modification similar to Fig. 2.

The Figs. 3 and 4 illustrate a camera in which the casing is substantially of the same construction as that shown in the Figs. 1 and 2 and therefore like parts have been designated with the same reference characters.

The modification shown in the Figs. 3 and 4 relates solely to the means which are actuated by the film F when the latter is moved across the picture window 14. Along both longitudinal sides of the picture window 14 are arranged the endless conveyor bands 40 which may consist of rubber or rubber-like material. The outer faces of these bands, which are directed toward the film F, are provided with tooth-like projections 41 which are adapted to enter the perforations 42 in the film. As shown in the drawing, a series of projections 41 extending substantially along the entire length of the picture window 14 is in engagement with the perforations in the film. The endless bands pass over a pair of rollers 44, one of which, namely the one next to the film winding knob 34, is operatively connected by means of a transmission (not shown) with the knob 34 to be rotated by the latter. The movement of the endless conveyor bands 40 is transmitted to the film F by the projections 41 which enter the perforations 42 of the film. Owing to the elasticity of the bands 40 a great number of the projections 41 will engage simultaneously the edge of the perforations 42 which they entered to move the film uniformly across the picture window.

The endless conveyor bands 40, 41 may also be used for operating additional devices, as a film advance locking mechanism, a counting mechanism or the like. These additional mechanism are preferably arranged in the compartment 22.

This last described modification may be further modified by substituting for the endless conveyor bands 40, 41, which are made of rubber or the like, other conveyor members, as for instance link chains, so called Gall chains, which are provided at the outer faces with tooth-like projections adapted to engage the film perforations. By the insertion of spring-like members in the chains the latter may be made sufficiently elastic to insure a simultaneous engagement of a number of projections with the perforations of the film.

While the endless conveyor belts or chains as disclosed above are arranged and moved in planes which are positioned perpendicularly to the picture plane or the plane in which the film is moved, it is also possible to arrange the conveyor belts or chains in a plane parallel to the picture plane. In such a case the projections which enter the perforations of the film would have to be arranged on that side or edge of the conveyor members which face the emulsion side of the film.

Obviously, it is not necessary to arrange an endless conveyor member along both perforated edges of the film, for it is sufficient to provide only one conveyor belt or chain for one edge of the film. The engagement of the conveyor bands 40, 41 with the film may also extend only along a portion of the length of the picture window 14, if this for any reason, as for instance for lack of space, should be necessary. In order to insure a good engagement of the conveyor band 40 with the film, there may be provided a special pressure plate or bar 50 which according to Fig. 4 acts upon the inner face of that portion of the band which engages the film.

What I claim is:

1. In a rollfilm camera employing standard motion picture film, a camera casing provided in its focal plane with a wall having a rectangular picture window past which said film is movable, two rotatable sprockets for meshing with the perforations in said film and driven by the latter, both said sprockets being mounted on one side of said picture window, one behind the other, so as to be engaged by the row of film perforations in one marginal portion of the film, means for causing said sprockets to rotate in synchronism, said means including a pinion coaxially fixed to each of said sprockets and a gear meshing with both said pinions, the teeth of said sprockets being so positioned with respect to each other and said pinions that alternately one tooth of one sprocket and then a tooth of the other sprocket moves in mesh with the perforations of the film, and means operatively connected with said gear for limiting the movement of said film after each exposure to a length which is substantially equal to the length of said picture window.

2. In a rollfilm camera which employs perforated motion picture film and which has a wall provided with a picture window positioned in the focal plane and which has means for moving the film across the window, the combination of driven means for controlling film feed and shutter mechanism comprising at least two rotatable sprockets for meshing with the perforations in said film and driven by the film as it is moved across said window and being located just outside the picture window to engage the portion of the film covering the picture window, the teeth of said sprockets being positioned with respect to each other to alternately have one tooth of one sprocket and then a tooth of the other sprocket move in mesh with the film perforations and means coupling said sprockets together whereby the sprockets rotate synchronously.

HUBERT NERWIN.